(12) United States Patent
Keipert et al.

(10) Patent No.: US 6,641,627 B2
(45) Date of Patent: Nov. 4, 2003

(54) ABRASIVE ARTICLES

(75) Inventors: Steven J. Keipert, Somerset, WI (US); Louis S. Moren, Mahtomedi, MN (US); Dennis G. Welygan, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/862,840

(22) Filed: May 22, 2001

(65) Prior Publication Data

US 2002/0177387 A1 Nov. 28, 2002

(51) Int. Cl.[7] .............................. B24D 3/00; B24D 3/32
(52) U.S. Cl. .......................... 51/296; 51/298; 51/307; 51/308; 51/309
(58) Field of Search ..................... 51/298, 309, 307, 51/308, 296, 306

(56) References Cited

U.S. PATENT DOCUMENTS

| | | |
|---|---|---|
| 2,780,533 A | 2/1957 | Hurst |
| 2,885,276 A | 5/1959 | Upton, Jr. |
| 2,972,527 A | 2/1961 | Upton, Jr. |
| 3,252,775 A | 5/1966 | Tocci-Guilbert |
| 3,598,772 A | 8/1971 | Hood et al. |
| 3,607,159 A | 9/1971 | Haywood |
| 3,915,671 A | 10/1975 | Kagawa |
| 3,925,034 A | 12/1975 | Anna et al. |
| 3,982,359 A | 9/1976 | Elbel et al. |
| 4,035,161 A | 7/1977 | Geissler et al. |
| 4,086,067 A | 4/1978 | Busch et al. |
| 4,128,972 A | 12/1978 | Charvat |
| 4,150,955 A * | 4/1979 | Samuelson ............... 51/298 |
| 4,253,850 A | 3/1981 | Rue et al. |
| 4,350,497 A | 9/1982 | Ogman |
| 4,421,526 A | 12/1983 | Strickman et al. |
| 4,459,779 A | 7/1984 | Shen |
| 4,581,287 A | 4/1986 | Smith et al. |
| 4,904,280 A | 2/1990 | Cygan et al. |
| 4,933,373 A | 6/1990 | Moren |
| 4,938,784 A | 7/1990 | Murakami et al. |
| 5,250,085 A | 10/1993 | Mevissen |
| 5,273,558 A | 12/1993 | Nelson et al. |
| 5,360,873 A * | 11/1994 | Ohkawa et al. ............ 525/193 |
| 5,492,550 A | 2/1996 | Krishnan et al. |
| 5,500,273 A | 3/1996 | Holmes et al. |
| 5,738,697 A | 4/1998 | Wu et al. |
| 6,465,076 B2 * | 10/2002 | Larson et al. ............... 428/143 |

FOREIGN PATENT DOCUMENTS

EP     0 008 868 A1     3/1980

OTHER PUBLICATIONS

Abstract for GB2167076, Koch et al., May 21, 1986.
Abstract for DE4006027, Kausch et al., Aug. 29, 1991.
Principles of Polymer Systems, Second Edition, Ferdinand Rodriguez, p. 464–467, (no date).
U.S. patent application Ser. No. 09/688,486, entitled "Method of Making an Agglomerate Particle", filed Oct. 16, 2000, Culler et al.
U.S. patent application Ser. No. 09/688,484, entitled "An Abrasive Article", filed Oct. 16, 2000, Culler et al.
U.S. patent application Ser. No. 09/688,444, entitled "Method of Making an Abrasive Agglomerate Particle", filed Oct. 16, 2000, Culler et al.
U.S. patent application entitled "Conformable Molded Foam Abrasive Article and Method of Making", filed May 22, 2001, Keipert et al., having Attorney Docket No. 56708USA8A.002.

* cited by examiner

*Primary Examiner*—Michael Marcheschi
(74) *Attorney, Agent, or Firm*—Richard Francis; Gregory D. Allen

(57) ABSTRACT

Abrasive articles (e.g., abrasive wheels) comprised of abrasive particles and polymeric material such as a polymeric reaction product of components comprising saturated polyol, saturated polyisocyanate, and a free radical source, and methods of making and using the abrasive articles.

12 Claims, 3 Drawing Sheets

ABRASIVE ARTICLES

FIELD OF THE INVENTION

The present invention relates to abrasive articles comprised of abrasive particles and polymeric material such as a polymeric reaction product of components comprising saturated polyol, saturated polyisocyanate, and a free radical source.

DESCRIPTION OF RELATED ART

Abrasive articles comprising abrasive particles coated on and/or dispersed within an organic cellular or foam substrate, (e.g., polyurethane) are well known. Examples of such articles include pads, sheets, discs, and wheels (see, e.g., U.S. Pat. No. 2,780,533 (Hurst), U.S. Pat. No. 2,885,276 (Upton, Jr.), U.S. Pat. No. 2,972,527 (Upton, Jr.), and U.S. Pat. No. 3,252,775 (Tocci-Guilbert). These articles have been employed to abrade a variety of workpieces, including metal and wood. They have also been adapted for abrading operations ranging from coarse dimensioning operations such as "snagging" to fine finishing operations such as polishing and buffing.

Abrasive articles comprising abrasive particles dispersed within and/or adhered to a polyurethane cellular or foam matrix have been used, for example, to impart a final refined surface finish on metal (e.g., steel, stainless steel, aluminum, titanium or titanium alloys) substrates designed for use in any of many applications. In finishing such substrates, what is desired is the ability to repeatedly, from part to part, impart a finish to the metal surface, conform to the design features of the metal surface, and not leave residual abrasive article material ("smearing") on the finished metal surface. Current foam abrasives do not concurrently provide the desired level of each of these features.

SUMMARY OF THE INVENTION

The present invention provides abrasive articles (e.g., an abrasive wheel) comprised of abrasive particles and polymeric material. Preferred abrasive articles according to the present invention include abrasive articles comprised of abrasive particles and polymeric reaction product of components comprising saturated polyol, saturated polyisocyanate, and a free radical source (e.g., peroxide).

Abrasive articles according to the present invention also include abrasive articles comprised of abrasive particles and polymeric material comprised of a saturated polyurethane preparable by combining components comprising saturated polyol, saturated polyisocyanate, and a free radical source (e.g., peroxide).

Although not wanting to be bound by theory, it is believed that the polymeric reaction product of isocyanate-functional moieties (with a functionality of 2 or greater) (e.g., a polyisocyanate), with materials reactive with isocyanate-functional moieties, (e.g., hydroxy-functional materials) with a functionality of 2 or greater (e.g., a polyol) is polyurethane. As a general class, term "polyurethane" as used herein includes true polyurethanes, true polyurea, poly-urea urethanes, and polyurethane ureas. Isocyanate-functional materials and isocyanate-functional reactive materials vary widely in equivalent weight. Hence, the reaction stoichiometry is based on the isocyanate index (the equivalents of isocyanate functional moieties divided by the equivalents of the isocyanate reactive-functional moieties times one hundred), so that an isocyanate index of 100 means a stoichiometric balance (i.e., that one isocyanate functionality has one isocyanate reactive functionality with which to react). For preferred abrasive articles according to the present invention, there are, by weight, typically 2 parts of free radical source and 20 parts of abrasive particles per hundred parts of the polymeric reaction product of saturated polyol and saturated polyisocyanate.

Preferably, abrasive articles according to the present invention are comprised of a polymeric matrix having voids dispersed throughout. The voids may be isolated (i.e., "closed cell") and/or intercommunicating (i.e., "open cell"). The polymeric matrix may be flexible or rigid. Further, abrasive articles according to the present invention preferably have at least 25 percent void volume, more preferably, at least 50 percent void volume, and even more preferably are in the range from 75 to 90 percent void volume, wherein the percent void volume is a calculated value equal to the difference between the article volume and the sum of the material solids volume fractions of the various components, divided by the article volume, times 100%.

In another aspect, abrasive articles according to the present invention are preferably further comprised of lubricant (e.g., metallic salts of fatty acids, solid lubricants, esters of fatty acids, mineral oils and waxes, and poly (dimethylsiloxane) gum).

In another aspect, the present invention provides a method for making an abrasive article comprising:
combining components comprising saturated polyol, saturated polyisocyanate, a free radical source, and abrasive grains to provide a curable composition; and
curing the curable composition to provide an abrasive article.

In another aspect, the present invention provides a method of abrading a surface, the method comprising:
providing an abrasive article according to the present invention, the abrasive article having an outer surface;
frictionally contacting at least a portion of the outer surface of the abrasive article with a surface of a workpiece; and
moving at least of one the outer surface of the abrasive article or the surface of the workpiece relative to the other to abrade at least a portion of the workpiece surface. The method may include the use of a buffing compound, wherein the buffing compound is on at least a portion of the outer surface of the abrasive article.

Embodiments of abrasive articles according to the present invention are flexible, conformable, and lightweight. Preferred abrasive wheels according to the present invention can be run smoothly and exhibit less "chatter" than conventional abrasive wheels. Further, preferred abrasive wheels according to the present invention can utilize less abrasive grain material than conventional abrasive wheels. Preferred abrasive articles according to the present invention also tend not to "smear" during use. Smearing, which is typically undesirable, can occur when a workpiece in contact with an abrasive article becomes sufficiently hot such that portions of the abrasive article soften and transfer to the workpiece.

DETAILED DESCRIPTION

Figure 1:
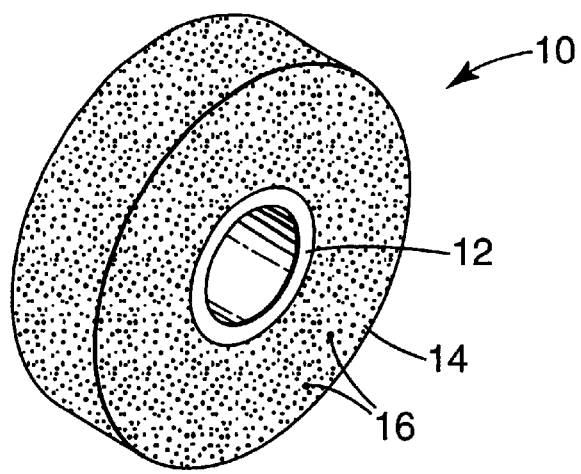
FIG. 1 is a perspective view of an abrasive wheel according to the present invention.
Figure 2:
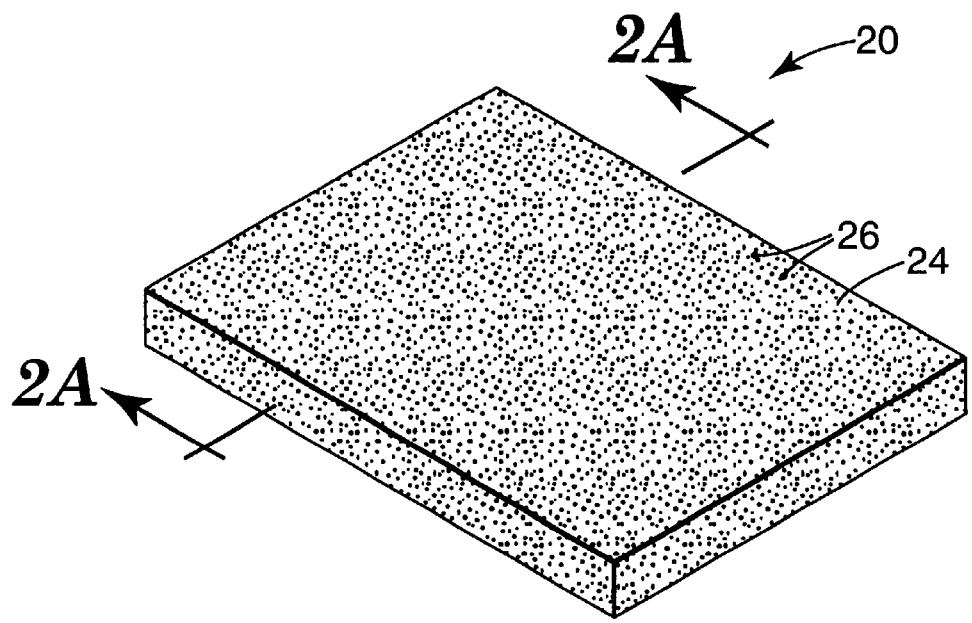
FIG. 2 is a perspective view of an abrasive block according to the present invention.
Figure 2A:
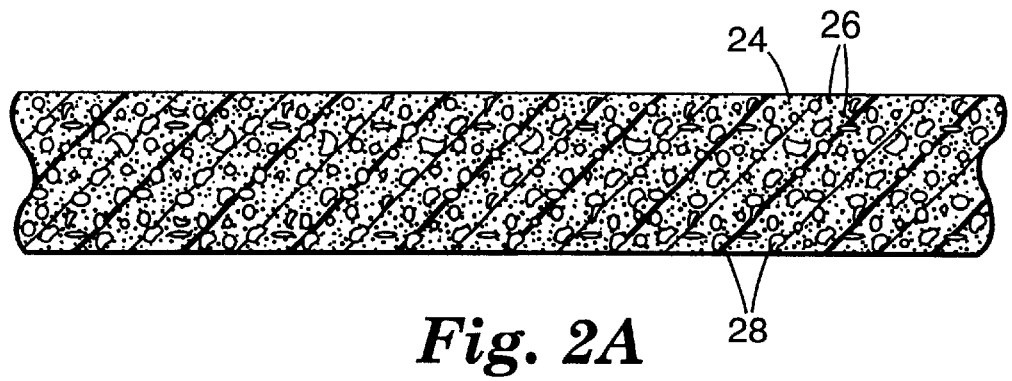
FIG. 2A is a cross sectional view of a segment of the abrasive block depicted in FIG. 2 taken along line 2A—2A.
Figure 3:
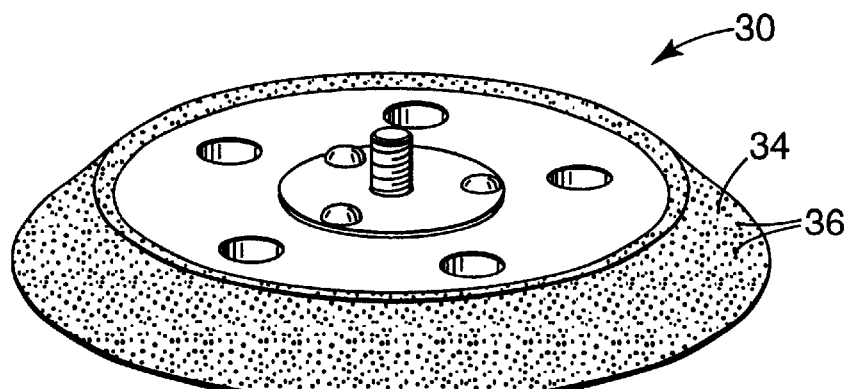
FIG. 3 is a perspective view of an abrasive disc according to the present invention.

Abrasive article articles can be in any of a variety of shapes and configurations known in the art, including wheels, blocks, disks, and belts. Referring to FIG. 1, abrasive wheel according to the present invention 10 is comprised of inner ring core 12, polyurethane (e.g., polymeric reaction product of components comprising saturated polyol, saturated polyisocyanate, and a free radical source) matrix 14, and abrasive grains 16. In FIGS. 2 and 2A, abrasive block according to the present invention 20 is comprised of polyurethane matrix 24, abrasive grains 26, and voids 28. Further, for example, FIG. 3, shows abrasive disc according to the present invention 30 is comprised of attachable backing plate, polyurethane matrix 34, and abrasive grain 36.

Preferably, the polyisocyanate and polyol components provide an isocyanate index in the range from 80 to 120 and wherein the weight ratio of the free radical source to polymeric reaction product of the saturated polyol and saturated polyisocyanate is in the range from 1:1000 to 1:10 (more preferably, 1:100 to 1:20).

Saturated Polyols

As used herein, "saturated polyol" (or "non-olefinic polyol") refers to hydroxy-functional materials having a hydroxy functionality of at least 2, and exhibits a negative response to a classic bromine test for unsaturation, wherein dropwise addition of the polyol to an aqueous bromine solution does not cause rapid decolorization. Suitable saturated polyols include polyester polyols and polyether polyols. Useful polyester diols include those based on the condensation of diacids such as adipic; glutaric and phthalic acids with diols such as ethylene glycol; 1,2-propylene glycol; 1,3-propylene glycol; 1,4-butanediol; diethylene glycol; neopentyl glycol; 1,6-hexanediol and dipropylene glycol. Useful polyester triols include those based on condensation of the above in combination with triols such as trimethylolpropane or glycerin. Other useful polyester polyols include polycaprolactone polyols based on the polymerization of gamma-caprolactone with di and trifunctional starters; polyether diols such as polyethylene glycol; polypropylene glycol; polytetramethylene glycol and their copolymers and blends; polypropylene glycol triols incorporating trifunctional starters such as glycerol or trimethylolpropane. Suitable saturated polyols also include polyols chain-extended with a less than stoichiometric quantity of difunctional isocyanate to give a hydroxy-functional oligomer.

Other examples of saturated polyols include short chain diols and triols such as ethylene glycol; diethylene glycol; dipropylene glycol; 1,4-butanediol; 1,4-cyclohexane dimethanol; neopentyl glycol; 1,6-hexanediol; hydroquinone bis(2hydroxyethyl) ether; resorcinol bis(2-hydroxyethyl) ether; triethanolamine. Such short chain diols and triols may be used, for example, in combination with longer chain polyols to improve mechanical properties. In addition, amines may be incorporated into polyol to modify properties. Examples of such amines include those available from Albemarle Corp., Baton Rouge, La. under the trade designations "ETHACURE 100" and "ETHACURE 300", and from Air Products, Allentown, Pa. under the trade designation "VERSALINK 1000".

Sources of suitable saturated polyol for making abrasive articles according to the present invention are known in the art, and include that commercially available, for example, from Polyurethane Corporation of America (Polyurethane Specialties Company), Inc., Lyndhurst, N.J., under the trade designation "MILLOXANE 7209A" as part of a preformulated foam system. (This system also includes a saturated polyisocyanate under the trade designation "MILLOXANE 7209B"). As used herein, "preformulated" refers to a composition that includes not only the primary reactive component(s), but also has adjuvants such as stabilizers, catalysts, and blowing agents optimized to produce a desired polymeric reaction product.

Saturated Polyisocyanate

As used herein, "saturated polyisocyanate" (or "non-olefinic polyisocyanate") refer to isocyanate-functional materials having an isocyanate functionality of at least 2, that exhibits a negative response to a classic bromine test for unsaturation, wherein dropwise addition of the polyisocyanate to an aqueous bromine solution does not cause rapid decolorization, after the isocyanate functionality has been reacted with trimethylamine and ethanol to render the isocyanate further unreactive. Aromatic isocyanates are not considered to be unsaturated for the purposes of this disclosure. Suitable polyisocyanates include those based on diphenylmethane 4,4'-diisocyanate (4,4 MDI), diphenylmethane 2,4'-diisocyanate (2,4 MDI), diphenylmethane 2,2'-diisocyanate (2,2 MDI) and their mixtures as well as oligomers and modified forms such as carbodiimides, allophanates, as well as prepolymers and pseudo-prepolymers formed by complete or partial reaction with polyols to give isocyanate functional urethane oligomers alone or in combination with free isocyanate, as well as, isocyanates based on toluene 2,4-diisocyanate (2,4 TDI), toluene 2,6-diisocyanate (2,6 TDI) and mixtures of these two; prepolymers and pseudo-prepolymers formed by the complete or partial reaction with polyols to give isocyanate functional urethane oligomers alone or in combination with free isocyanate.

Sources of saturated polyisocyanate for making abrasive articles according to the present invention are known in the art, and include that commercially available, for example, from Polyurethane Corporation of America (Polyurethane Specialties Company), Inc. under the trade designation "MILLOXANE 7209B" as part of a preformulated foam system. This system also includes saturated polyol under the trade designation "MILLOXANE 7209A."

Free Radical Sources

Suitable free radical sources include organic peroxides, azo compounds, and persulfate compounds. Free radicals generated by actinic or ionizing radiation may also be employed for abrasive articles having suitably small dimensions or effective transparency. Preferred free radical sources for making abrasive articles according to the present invention include peroxide, azo compounds, persulfates, and combinations thereof. Such free radical sources, and commercial sources thereof, are known in the art. Other suitable free radical sources may be apparent to those skilled in the art after reviewing the present disclosure. Preferred amounts of free radical source materials are in the range from about 0.1% to about and 10% (more preferably, in the range from about 1% to about 5%) by weight of the polymeric reaction product of saturated polyol and saturated polyisocyanate.

Suitable organic peroxides include t-butyl peroxyisobutyrate; acetyl peroxide; lauroyl peroxide; benzoyl peroxide;

p-chlorobenzoyl peroxide; hydroxyheptyl peroxide; cyclohexanone peroxide; di-(t-butyl) diperphthalate; t-butyl peracetate; t-butyl perbenzoate; dicumyl peroxide; t-butyl hydroperoxide; methyl ethyl ketone peroxide; di-(t-butyl) peroxide; pinane hydroperoxide; cumene hydroperoxide; t-butyl peroxy-2-ethyl hexanoate; 1,1'-bis (t-butylperoxy)-3,3,5-trimethylcyclohexane; 2,5-dimethyl-2,5-di(t-butylperoxy)hexane; 2,5-dimethylhexane 2,5-dihydroperoxide; dicetyl peroxydicarbonate; di(4-t-butylcyclohexyl) peroxydicarbonate; and t-butylperoxypivalate.

Suitable azo compounds include 2,2'-azobis(4-methoxy-2,4-dimethylvaleronitrile); 2,2'-azobis(2-amidinopropane) dihydrochloride; 2,2'-azobis(2,4-dimethylvaleronitrile; 2,2'-azobis(isobutyronitrile); 2,2'-azobis(2-methylbutyronitrile); 1,1'-azobis(1-cyclohexanecarbonitrile); and 2,2'-azobis (methyl isobutyrate).

Suitable persulfate initiators include potassium, sodium or ammonium persulfate, alone or in combination with reducing agents such as bisulfites.

Suitable abrasive grains for making abrasive articles according to the present invention include fused aluminum oxide (including white fused alumina, heat-treated aluminum oxide and brown aluminum oxide), silicon carbide (including green silicon carbide), boron carbide, titanium carbide, diamond, cubic boron nitride, garnet, tripoli (microcrystalline $SiO_2$), chromium oxide, cerium oxide, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Other suitable abrasive grains may be apparent to those skilled in the art after reviewing the present disclosure.

Abrasive articles according to the present invention can contain 100% of a particular type and/or grade of abrasive grain, or blends thereof. If there is a blend of abrasive grains, the abrasive grain types forming the blend may be of the same size. Alternatively, the abrasive grain types may be of different particle sizes.

The abrasive grains may also be present in the form of agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 4 to about 15000 micrometers, typically about 600 to about 1200 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,486, 09/688,484, and 09/688,444. U.S. Pat. No. 6,521,004, filed Oct. 16, 2000, and 09/862357, filed May 22, 2001, the disclosures of which are incorporated herein by reference.

One preferred type of organic bonded abrasive agglomerate particle is formed from abrasive grains and a radiation curable polymerizable binder precursor, has a substantially constant cross-sectional area, and a crush strength greater than 1 pound (see, e.g., co-pending applications having U.S. Ser. Nos. 09/688,486, 09/688,484, and 09/688,444, filed Oct. 16, 2000, the disclosures of which are incorporated herein by reference above).

Abrasive articles according to the present invention may further comprise diluent particles such as marble, gypsum, flint, silica, iron oxide, aluminum silicate, and glass (including glass bubbles and glass beads). For example, the abrasive article may have a diluent particle to abrasive grain ratio between 2 to 50% by weight.

Examples of lubricants for making abrasive articles according to the present invention include metallic salts of fatty acids (e.g., lithium stearate, zinc stearate), solid lubricants (e.g., (poly)tetrafluoroethylene (PTFE), graphite, and molybdenum disulfide), mineral oils and waxes, carboxylic acid esters (e.g., butyl stearate), poly(dimethylsiloxane) gum, and combinations thereof. Such lubricants, and commercial sources thereof, are known in the art. Other suitable lubricants may be apparent to those skilled in the art after reviewing the present disclosure.

Foaming agents, also known as "blowing agents", may also be used to aid in providing abrasive articles according to the present invention. Generally, the preformulated saturated polyol contains, among other things, sufficient blowing agent to cause foaming of the composition. In the event higher void volume foams are desired, additional or other blowing agents may be included such as water, low-boiling liquids (e.g., cyclopentane) and chemicals that decompose to evolve gases (e.g., azo compounds such as azodicarbonimides). Alternatively, or in addition, for example, air (or other environmental gas) may be incorporated or entrained into the composition via turbulent mixing or frothing.

Other optional additives for making abrasive articles according to the present invention include pigments such as titanium dioxide or iron oxide, polymerization catalysts (e.g., dibutyltin dilaurate, tertiary amines, etc.), foam stabilizers (e.g., surfactants such as siloxane block copolymers), thermal or UV stabilizers or antioxidants), and/or grinding aids.

Examples of grinding aids for making the abrasive articles according to the present invention include waxes, organic halide compounds, halide salts, and metals. Such grinding aids, and commercial sources thereof, are known in the art. Other suitable grinding aids may be apparent to those skilled in the art after reviewing the present disclosure. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other grinding aids include sulfur, organic sulfur compounds, graphite, and metallic sulfides. It is also within the scope of the present invention to use a combination of different grinding aids. The preferred grinding aid is cryolite; the most preferred grinding aid is potassium tetrafluoroborate ($KBF_4$).

Typically, the saturated polyol is blended with the free radical source, and optional additives such as lubricants, followed by the addition and blending in of abrasive grains and optional additives such as pigments. The last ingredient added and blended in is typically the saturated polyisocyanate. Other mixing orders, however, may also be useful. The abrasive grains and optional additives such as lubricants may be dispersed in the saturated polyol, for example, using a mixer such as that available, for example, from Morehouse-COWLES, Fullerton, Calif. under the trade designation "DISCPERSER MIXER".

The ingredients may also be blended together, for example, using a continuous mixer, wherein the ingredient streams are metered via metering devices (e.g., gear pumps into the mixer). The mixer preferably includes a high shear mixing blade. Continuous mixers are commercially available, for example, from Edge Sweets Company, Grand Rapids, Mich. under the trade designation "FFH MIXER". The saturated polyol and nonabrasive optional additives may be continuously metered to a continuous mixer using, for example, a pump such as that available under the trade designation "ZENITH GEAR PUMP" from, Zenith Products Division, Sanford, N.C. Optionally the saturated polyol and optional additives such as lubricants or abrasive additives may be continuously metered to a continuous mixer using, for example, a pump such as that available under the trade designation "MOYNO PROGRESSIVE CAVITY PUMP" (Model FC2C SSE3 DAA) from Moyno, Inc, Springfield, Ohio. Optionally, the abrasive grains may be added such that abrasive contact with pump parts is minimized. For example, the abrasive grains may be continuously metered to a continuous mixer using a single or twin screw volumetric feeder such as that available under the trade designation "K-TRON TWIN SCREW VOLUMETRIC FEEDER" (Model T 35), from K-Tron International, Inc., Pitman N.J., directly into the mixer rather than predispersing them in the saturated polyol. The polyisocyanate may be continuously metered to a continuous mixer using, for example, a pump such as that available under the trade designation "ZENITH GEAR PUMP" from, Zenith Products Division, Sanford, N.C.

The abrasive articles can be formed generally using techniques known in the art, including the use of molds. For example, suitable molds for making abrasive wheels include a ring of the appropriate desired diameter and height, have a top and bottom sealing surface (mold plate), and a core pin through the center of the top and bottom plates. Suitable molds, including materials (e.g., metal, cardboard, fiberglass, phenolic, and plastic) for constructing the molds, are well known in the art. A release liner (e.g., of silicone coated paper) may be used to facilitate removal of the abrasive article from the mold.

The saturated polyol/saturated polyisocyanate/free radical source/etc. mixture typically expands during curing. Such expansion should be taken into account when selecting and filling the mold, as well as the desired void volume or density of the abrasive article.

Although not wanting to be bound by theory, it is believed that the Durometer or hardness of the abrasive article is significantly affected by the abrasive grain to polymer ratio (AG/P), wherein polymer in this context refers to the polymeric reaction product of the polyisocyanate and the polyol. Durometer scales range from Shore A, for soft materials, to Shore D for firmer materials. For preferred articles according to the present invention, Shore A is an indicator of the conformability and hardness of the cellular polymeric material. The flexibility and abrading performance of abrasive articles according to the present invention can be adjusted, for example, by adjusting the abrasive grain to polymer ratio. For example, having a AG/P ratio up to about 0.33 typically results in a flexible cellular polymeric material, but with a relatively lower cut rate. Having a AG/P ratio of about 0.5 or greater typically results in harder cellular polymeric materials and abrasive articles exhibiting relatively lower conformability and relatively higher cut rates.

Preferably, the abrasive articles according to the present invention have a density of at least 0.1 $g/cm^3$, more preferably, in the range from 0.1 to 1.2 $g/cm^3$, most preferably 0.1 to 0.6 $g/cm^3$ and a Shore A durometer value of at least 10, more preferably, in the range from 10 to 50.

For abrasive articles comprising fine grades (typically ANSI 400 and finer) of abrasive grains, the abrasive grains are typically located in the cell walls of the polymeric material. Further, it is believed that the abrasive grains located in the cell walls act as a filler and stiffen the resulting foam.

For articles formed with a closed mold (i.e., a mold where the foam precursor is added, and the mold sealed), overfilling the molds tends to decrease the amount of void space, which tends to lead to an increase in the article density and general decrease in the foam conformability.

The saturated polyol/saturated polyisocyanate/free radical source/etc. mixture is usually cured with heat. Typically, the curing takes place in two distinct stages, referred to as a "cure" and a "post cure". First, the mixture is cured (i.e., substantially formed by the reaction of the saturated polyol and the saturated polyisocyanate) while the mold is maintained at a first temperature. Subsequently, a second cure stage (i.e., a post cure) is accomplished by heating the article to a second temperature greater than the first temperature. At the second temperature, the free radical source provides for an additional curing step to render the article more suitable for use. The second temperature(s) is sufficiently high, and is maintained for a sufficient period time to decompose the free radical source so that the second stage cure is substantially completed. For example, the mixture is typically heated to, and held at a temperature(s) in the range from about 25° C. to about 100° C. (or a temperature that is 50° C. less than the decomposition temperature of the free radical source, whichever is less) for several minutes to hours (more typically for about 45–60 minutes).

It is within the scope of the present invention to use disposable mold rings in combination with release liners on the metal top and bottom mold plates. For example, a spiral wound cardboard tube may be employed as a disposable mold ring. The tube can be centered on the bottom mold plate, the reactive composition deposited into the interior of the tube, the top mold plate applied to the top of the tube, and clamped to securely retain the resulting mold assembly. Such a mold set up can allow partial curing for relatively shorter de-mold times, wherein the partially cured article contained within the cardboard tube is removed from the mold assembly, and then further cured.

Abrasive articles according to the present invention are typically dressed (i.e., outer skin layers of the article removed) prior to use.

Abrasive articles according to the present invention preferably have a glass transition temperature, $T_g$ (measured as described below for Example 2 and Comparative Example D abrasive wheels), in the range from about −60° C. to about 50° C. (more preferably the range from about 0° C. to about 40° C.). Abrasive wheels having $T_g$'s outside the preferred ranges, although useful, tend to exhibit more undesirable characteristics such as chatter. Further, for example, abrasive wheels with $T_g$'s less than about −20° C. tend to be relatively elastic, whereas abrasive wheels with $T_g$'s greater than about 50° C. tend to be relatively rigid. Abrasive wheels having $T_g$'s within the preferred range are conformable and exhibit desirable vibration damping characteristics (i.e., they don't exhibit chatter during use). Preferred abrasive articles according to the present invention also tend not to "smear" during use. Although not wanting to be bound by theory, it is believed that the presence of the free radical source effects the crosslinking between the polymer chains resulting in improved thermal characteristics of the polymeric material (e.g., better high temperature performance and reduced smear). Further, the addition of a free radical source such as peroxide has been observed to broaden the $T_g$ range allowing the improved abrasive article performance characteristics to be exhibited over a broader temperature range. For example, preferred abrasive articles according to the present invention run more smoothly and exhibit less chatter than conventional wheels. Further performance improvements have been observed with the further addition of a lubricant. For example, smearing is further reduced or eliminated with the addition of a lubricant.

Abrading with abrasive articles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like. Abrasive articles according to the present invention may be used with externally-applied abrasive compounds, such as those known as polishing or buffing compounds.

Abrasive articles according to the present invention may be used to abrade workpieces such as aluminum and aluminum alloys, carbon steels, mild steels, tool steels, stainless steel, hardened steel, brass, titanium, glass, ceramics, wood, wood-like materials, plastics, paint, painted surfaces, organic coated surfaces and the like.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

An abrasive wheel was made as follows. A mixture was prepared by combining 150 grams of a preformulated saturated polyol (obtained under the trade designation "MILLOXANE 7209A" from Polyurethane Specialties Company Inc, Lyndhurst, N.J.), 15 grams of lithium stearate lubricant powder, and 6 grams of t-butyl peroctoate (a thermally activated free radical source; obtained from AKZO Chemicals, Inc., Pasedena, Tex. under the trade name designation "TRIGONOX 21-OP050"). The mixture was stirred vigorously at high speed with a conventional laboratory three blade, air motor mixer.

When the lithium stearate was well dispersed, 150 grams of a preformulated saturated polyisocyanate (obtained under the trade designation "MILLOXANE 7209B" from Polyurethane Specialties Company Inc, Lyndhurst, N.J.) was added to the mixture without stirring; followed by 60 grams of green silicon carbide having an average particle size of 14.7 micrometers (Dv50% as measured by a Multisizer; obtained under the trade designation "GC800" from Fujimi Corporation, Elmhurst, Ill.). These additional components were then well mixed into the mixture at high speed with the air motor mixer for about 20 seconds. The cream time for this foam system, which allows sufficient time for mixing without an immediate reaction, was about 21 seconds.

The resulting mixed material was quickly, and with minimal waste, transferred to a steel mold having a 20.6 cm (8.125 inch) diameter, 5.1 cm (2 inch) deep cavity with a release liner on the bottom. A 7.6 cm (3 inch) diameter fiberglass core weighing about 100 grams had been placed in the center of the mold. The mold had been pre-heated to 54° C. (130° F.). The "mixed" material was evenly distributed in the mold, another release liner layer was applied, and the mold tightly capped to maintain a closed mold during the reaction of the components. The filled mold was placed in an oven heated to 54° C. (130° F.). After 1 hour the resulting article was removed from the mold and placed in an oven heated to 110° C. (230° F.) for 3 hours. The resulting abrasive wheel was 5.1 cm (2 inches) thick, and had an inside diameter of 7.6 cm (3 inches) and an outside diameter of 20.6 cm (8.125 inches). The abrasive wheel weighed 467 grams, had a AG/P ratio of 0.2, a density of 0.25 g/cm$^3$ (4.2 g/in$^3$), a Shore A durometer value of 29–31, and a void volume of 80.5%.

The work surface of the wheel was dressed with an abrasive tool to remove the surface skin of the wheel.

An Example 1 abrasive wheel was mounted on a variable speed lathe (obtained under the trade name designation "HAMMOND POLISHING AND BUFFING LATHE" from Hammond Roto-Finish, Kalamazoo, Mich.). The periphery of the rotating example 1 abrasive wheel was topically coated with a light layer of steel buffing compound (obtained from Formax, Detroit, Mich. under the trade designation "HIGH COLORING GRADE"; Product #515106-DR). A titanium work-piece (golf club head) was brought into contact with the rotating wheel (1800 RPM (about 3770 SFPM)) using hand pressure (equivalent to a loading of about 1.4–2.3 kilograms (about 3–5 lbs.)) for about 3–5 seconds on various portions of the workpiece. A very fine, almost mirror finish was achieved.

Example 2

The Example 2 abrasive wheel was prepared as described in Example 1 except water was added to the mixture to create a lower density foam, and the mixture contained 102 grams of the preformulated saturated polyol ("MILLOXANE 7209A"), 122.2 grams of the preformulated polyisocyanate ("MILLOXANE 7209B"), 45 grams of green silicon carbide having an average particle size of 14.7 micrometers (Dv50%; "GC800"), 11.25 grams of the lithium stearate, 4.5 grams of t-butyl peroctoate ("TRIGONOX 21-OP050"), and 0.77 gram of de-ionized water.

The resulting abrasive wheel was 5.1 cm (2 inches) thick, and had an inside diameter of 7.6 cm (3 inches) and an outside diameter of 20.6 cm (8.125 inches). The abrasive wheel weighed 373 grams, had a AG/P ratio of 0.2, a density of 0.19 g/cm$^3$ (3.2 g/in$^3$), a Shore A durometer value of 18–20, and a void volume of 85.5%.

The work surface of the wheel was dressed with an abrasive tool to remove the surface skin of the wheel.

Example 3

The Example 3 abrasive wheel was made as follows. A mixture was prepared by combining 11,495 grams of the preformulated saturated polyol ("MILLOXANE 7209A"), 1266 grams of the lithium stearate lubricant powder, 508 grams of t-butyl peroctoate ("TRIGONOX 21-OP050"), 86.2 grams of de-ionized water, and 267.8 grams of iron oxide powder (as a pigment). This mixture was stirred vigorously at high speed with an industrial mixer (obtained under the trade designation "COWLES "DISCPERSER" from Morehouse-COWLES, Fullerton, Calif.).

When the lithium stearate was well dispersed, 5448 grams of green silicon carbide having an average particle size of 14.7 micrometers (Dv50% "GC800") was added to the mixture, and mixed until well dispersed. The mixture was pumped at a rate of 930 g/min. with a pump (obtained under the trade designation "MOYNO PROGRESSIVE CAVITY PUMP" from Moyno, Inc., Springfield, Ohio) into an inlet port of the mixing head of a mixer (obtained under the trade designation "FFH MIXER" from Edge Sweets Company, Grand Rapids, Mich.). The preformulated polyisocyanate ("MILLOXANE 7209B") was pumped at a rate of 676 g/min. with a gear pump (obtained under the trade designation "ZENITH GEAR PUMP" from Zenith Products Division, Sanford, N.C.) into the other inlet port of the mixing head of the mixer. The mixing head combined and vigorously mixed the inlet streams.

The resulting mixed material was directed to a waste container for 25 seconds to allow the mixer to become stabilized. After 25 seconds, the mixed material was directed into a cardboard and steel mold having a 30.5 cm (12 inch) diameter, 30.5 cm (12 inch) deep cavity with a release liner, for 210 seconds. A 12.7 cm (5 inch) diameter fiberglass core weighing about 1006 grams had been placed in the center of the mold. The mold was at room temperature. The "mixed" material was evenly distributed in the mold, a release liner applied, and tightly capped to maintain a closed mold during the reaction of the system. The filled mold was placed in an oven heated to 54° C. (130° F.). After 1 hour the top and bottom steel plates of the mold were removed and the abrasive article, still in the cardboard molding tube, was placed in an oven heated to 110° C. (230° F.) for an additional 6 hours.

The resultant abrasive article was 30.5 cm (12 inches) thick, had an inside diameter of 12.7 cm (5 inches), an outside diameter of 30.5 cm (12 inches), and weighed 8764 grams (6173 grams without the cardboard molding tube). This abrasive article was cut into wheels 5.1 cm (2 inches) thick. The abrasive wheel, after removing the cardboard and dressing to about 27.9 cm (11 inches) outside diameter weighed 824 grams, had a AG/P ratio of 0.2, a density of 0.29 g/cm$^3$ (4.8 g/in$^3$), a Shore A durometer value of 30, and a void volume of 78.5%.

Example 4

The Example 4 abrasive wheel was made as follows. A mixture was prepared by combining 11,495 grams of a preformulated polyol ("MILLOXANE 7209A"), 1266 grams of the lithium stearate lubricant powder, 508 grams of t-butyl peroctoate ("TRIGONOX 21-OP050"), 86.2 grams of de-ionized water, and 267.8 grams of blue pigment (obtained under the trade designation "blue paste 16S895" from Penn Color Inc., Doylestown, Pa.). This mixture was stirred vigorously at high speed with an industrial mixer ("COWLES DISCPERSER").

When the lithium stearate was well dispersed, 5448 grams of green silicon carbide having an average particle size of 14.7 micrometers (Dv50%; "GC800") was added to the mixture and mixed until well dispersed. The mixture was pumped at a rate of 1489 g/min. with a pump ("MOYNO PROGRESSIVE CAVITY PUMP") into an inlet port of the mixing head of a mixer ("FFH MIXER"). The preformulated polyisocyanate ("MILLOXANE 7209B") was pumped at a rate of 1098 g/min. with a gear pump ("ZENITH GEAR PUMP") into the other inlet port of the mixing head of the mixer. The mixing head combined and vigorously mixed the inlet streams.

The resulting mixed material was directed to a waste container for 25 seconds to allow the mixer to become stabilized. After 25 seconds, the mixed material was directed into a cardboard and steel mold having a release liner and a 30.5 cm (12 inch) diameter, 30.5 cm (12 inch) deep cavity for 100 seconds. A 12.7 cm (5 inch) diameter fiberglass core weighing about 1006 grams had been placed in the center of the mold. The mold was at room temperature. The "mixed" material was evenly distributed in the mold and a release liner applied. The mold was then tightly capped to maintain a closed mold during the reaction of the system. The filled mold was placed in an oven heated to 54° C. (130° F.). After 1 hour the top and bottom steel plates of the mold were removed and the abrasive article, still in the cardboard molding tube, was placed in an oven heated to 110° C. (230° F.) and held in the oven at 110° C. (230° F.) for 6 hours.

The resultant abrasive article was 30.5 cm (12 inches) thick and had an inside diameter of 12.7 cm (5 inches) and an outside diameter of 30.5 cm (12 inches) and weighed 7841 grams (5250 grams without the cardboard molding tube). This abrasive article was cut into wheels 5.1 cm (2 inches) thick. The abrasive wheel, after removing the cardboard and dressing to about 27.9 cm (11 inches) outside diameter weighed 711 grams, had a AG/P ratio of 0.2, a density of 0.24 g/cm$^3$ (3.9 g/in$^3$), a Shore A durometer value of 20, and a void volume of 82.0%.

Example 5

The Example 5 abrasive wheel was made as follows. A mixture was prepared by combining 200 grams polypropylene glycol triol (obtained under the trade designation "ARCOL 11-27" from Bayer, Pittsbury, Pa.), 15 grams of lithium stearate lubricant powder, 4.5 grams of de-ionized water, 4 grams of diethanolamine (a polyisocyanate reactive crosslinker obtained from Aldrich Chemical Co., Milwaukee, Wis.), 2 grams of amine catalyst (obtained under the trade designation "NIAX A-300" from Witco, Greenwich, Conn.), 2 grams of stabilizer (obtained under the trade designation "NIAX L-3001" from Witco, Greenwich, Conn.), and 6 grams of t-butyl peroctoate ("TRIGONOX 21-OP050"). The mixture was stirred vigorously at high speed with a conventional laboratory three blade, air motor mixer.

When the lithium stearate was well dispersed, 100 grams of polyisocyanate (obtained under the trade designation "ISONATE 2143L" from Dow Chemical Co., Midland, Mich.) was added to the mixture without stirring; followed by 60 grams of green silicon carbide having an average particle size of 14.7 micrometers (Dv50%; "GC800"). These additional components were then well mixed into the mixture at high speed with the air motor mixer for about 10 seconds.

The resulting mixed material was quickly, and with minimal waste, transferred to a steel mold having a 20.6 cm (8.125 inch) diameter, 5.1 cm (2 inch) deep cavity having a release liner. A 3.2 cm (1.25 inch) diameter fiberglass core weighing about 45 grams had been placed in the center of the mold. The mold had been preheated to 54° C. (130° F.). The "mixed" material was evenly distributed in the mold, a release liner applied, and the mold tightly capped to maintain a closed mold during the reaction of the system. The filled mold was placed in an oven heated to 54° C. (130° F.). After 30 minutes the resulting article was removed from the mold and placed in an oven heated to 100° C. (230° F.) for 6 hours. The resulting abrasive wheel was 5.1 cm (2 inches) thick, and had an inside diameter of 3.2 cm (1.25 inch), and an outside diameter of 20.6 cm (8.125 inches). The abrasive wheel weighed 382 grams, had a AG/P ratio of 0.2, a density of 0.21 g/cm$^3$ (3.4 g/in$^3$), a Shore A durometer value of 17, and a void volume of 82.5%.

The work surface of the wheel was dressed with an abrasive tool to remove the surface skin of the wheel.

Comparative Examples A, B, C, D, and E

The Comparative Example A wheel was prepared as described in Example 1 except no abrasive grain, free radical source, or lubricant was used; a 3.2 cm (1.25 inch) fiberglass core was used; the initial cure was for one hour at 54° C. (130° F.), and the post-cure was for 6 hours at 100° C. (212° F.). The wheel had a density of 0.40 g/cm$^3$ (6.51 g/in$^3$) and a Shore A durometer value of 15–16.

The Comparative Example B wheel was prepared as described in Example 1 except no abrasive grain or lubricant was used; a 3.2 cm (1.25 inch) fiberglass core was used; the initial cure was for one hour at 54° C. (130° F.), and the post-cure was for 6 hours at 100° C. (212° F.). The wheel had a density of 0.41 g/cm$^3$ (6.72 g/in$^3$) and a Shore A durometer value of 18–20.

The Comparative Example C abrasive wheel was prepared as described in Example 1 except no free radical source or lubricant was used; a 3.2 cm (1.25 inch) fiberglass core was used; the initial cure was for one hour at 54° C. (130° F.), and the post-cure was for 6 hours at 100° C. (212° F.). The abrasive wheel had a density of 0.48 g/cm$^3$ (7.85 g/in$^3$) and a Shore A durometer value of 20–21.

The Comparative Example D abrasive wheel was prepared as described in Example 1 except that no free radical source was used and the post cure occurred at 54° C. (130° F.) for 3 hours. The resulting abrasive wheel was 5.1 cm (2 inches) thick, and had an inside diameter of 7.6 cm (3 inches) and an outside diameter of 20.6 cm (8.125 inches). The abrasive wheel weighed 459 grams, had a AG/P ratio of 0.2, a density of 0.25 g/cm$^3$ (4.1 g/in$^3$) a Shore A durometer value of 22–24, and a void volume of 81.8%.

The Comparative Example E abrasive wheel was prepared as described in Example 1 except that a granular zinc stearate lubricant was used at a higher loading instead of lithium stearate powder, no free radical source was present, and the post cure occurred at 54° C. (130° F.) for 3 hours. Further, the wheel was prepared by combining 112 grams of zinc stearate (having a mesh size of less than 325; obtained under the trade designation "BE" from Struktol Company of America, Stow, Ohio), 375 grams of a preformulated saturated polyol ("MILLOXANE 7209A"), 375 grams of a preformulated saturated polyisocyanate ("MILLOXANE 7209B"), and 225 grams of green silicon carbide having an average particle size of 17.9 micrometers (Dv50%; obtained under the trade designation "GC700" from Fujimi Corporation).

The resulting mixed material was quickly, and with minimal waste, transferred to a steel mold having a release liner in the bottom of a 31.8 cm (12.5 inch) diameter, 5.1 cm (2 inch) deep cavity. A 12.7 cm (5 inch) diameter fiberglass core weighing about 163 grams had been placed in the center of the mold and a release liner applied prior to closing the mold. The mold had been pre-heated to 54° C. (130° F.). The resulting abrasive wheel was 5.1 cm (2 inches) thick, and had an inside diameter of 12.7 cm (5 inches) and an outside diameter of 31.8 cm (12.5 inches). The abrasive wheel weighed 1167 grams, had a AG/P ratio of 0.3, a density of 0.34 g/cm$^3$ (5.5 gin$^3$), and a Shore A durometer value of 30–32.

The work surface of each of the comparative wheels (i.e., Comparative Example A–E) was dressed with an abrasive tool to remove the surface skin of the wheels.

Evaluations of the Wheels

Comparative Example A–E wheels, as well as an Example 3 abrasive wheel, were each evaluated on the variable speed lathe with a titanium work-piece as described in Example 1, except the buffing compound was not used. Smearing was observed for each of Comparative Examples A–E wheel. Comparative Example A–E wheels also left a residue. The Example 3 wheel did not smear, nor did it leave a residue.

Figure 4:
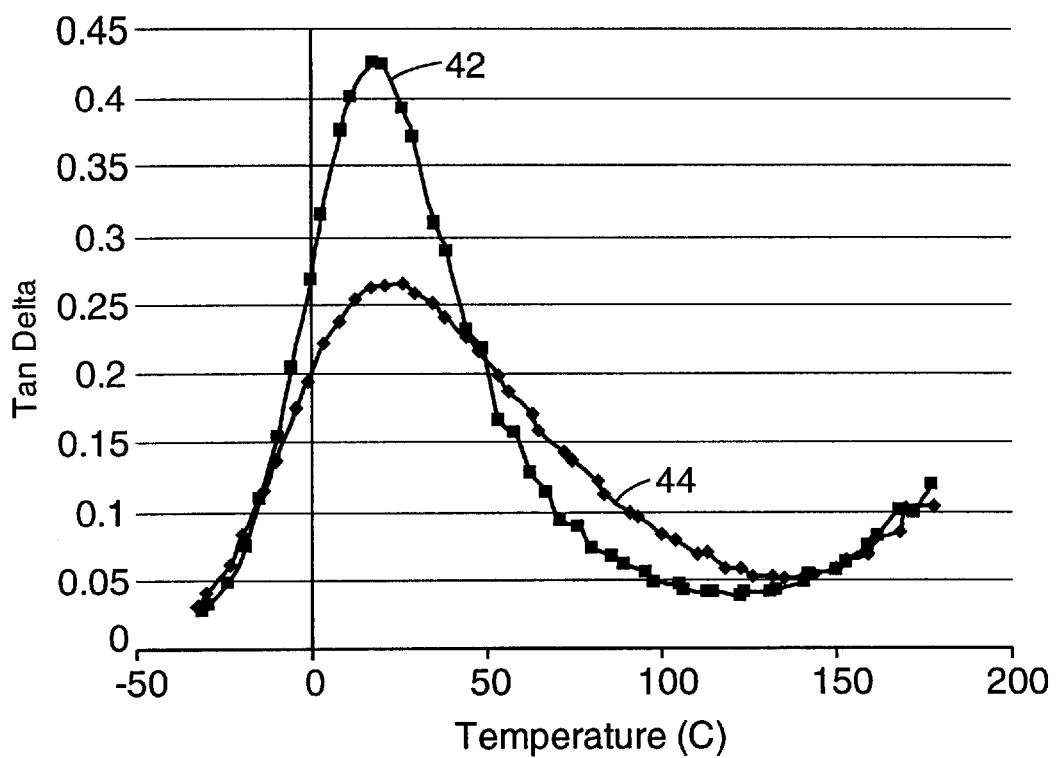
FIG. 4 are tan δ curves for Example 2 and Comparative Example D.

The glass transition, $T_g$, of the polymeric matrix of an Example 2 and Comparative Example D abrasive wheel were determined using conventional thermal analysis equipment (obtained under the trade designations "RHEOMETRICS SOLIDS ANALYZER II" and "DYNAMIC TEMPERATURE RAMP DEFAULT TEST" (a test protocol via computer software that is provided with the instrument) from Rheometric Scientific, Inc., Piscataway, N.J.). 40 mm×8 mm×2.5 mm test specimens were mounted in a film fiber fixture (supplied with the instrument) and evaluated from −30° C. to 200° C. at a 10° C./minute ramp rate, and a frequency of 6.28 Hz in the tensile mode. Both samples had a $T_g$ of 22° C., as measured by the peak of the tan δ curve (see FIG. 4, wherein line 42 is the tan δ curve for Example 2, and; line 44 is the tan δ curve for Comparative Example D). For Example 2, however, there was broadening of the tan δ curve. Although not wanting to be bound by theory, it is believed this broadening was due to the crosslinking reaction resulting by the presence of the free radical source in the post curing of the mixture.

An Example 2 abrasive wheel was evaluated on the variable speed lathe with a titanium work-piece as described in Example 1, except the buffing compound was not used. The wheel was observed to run smoothly.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An abrasive article comprised of abrasive particles, lubricant and polymeric reaction product of components comprising saturated polyol, saturated polyisocyanate, and a free radical source, said abrasive article having a void volume of at least 25 percent, a density in the range of from 0.1 g/cm³ to 1.2 g/cm³ and a Show A durometer in the range of from 10 to 50.

2. The abrasive article according to claim 1, which is an abrasive wheel.

3. The abrasive article according to claim 1 having a void volume of at least 50 percent.

4. The abrasive article according to claim 1 having a void volume of in the range from 75 to 90 percent.

5. The abrasive article according to claim 1 wherein the free radical source includes a peroxide.

6. The abrasive article according to claim 1 wherein the free radical source is selected from the group consisting of peroxides, azo compounds, persulfates, and combinations thereof.

7. The abrasive article according to claim 1 wherein the lubricant includes a lubricant selected from the group consisting of metallic salts of fatty acids, solid lubricants, esters of fatty acids, mineral oils and waxes, and combinations thereof.

8. The abrasive article according to claim 1 wherein the lubricant includes a lubricant selected from the group consisting of lithium stearate, zinc stearate, polytetrafluoroethylene, graphite, molydisulfide, butyl stearate, polydimethyl siloxane gum, and combinations thereof.

9. The abrasive article according to claim 1 wherein the abrasive grains include silicon carbide.

10. The abrasive article according to claim 1 wherein the polymeric reaction product has a $T_g$ in the range from about −60° C. to about 50° C.

11. The abrasive article according to claim 1 wherein the polyisocyanate and polyol components provide an isocyanate index in the range from 80 to 120 and wherein the weight ratio of the free radical source to polymeric reaction product of the saturated polyol and saturated polyisocyanate is in the range from 1:1000 to 1:10.

12. A method for making an abrasive article comprising:

combining components comprising saturated polyol, saturated polyisocyanate, a free radical source, a lubricant, and abrasive grains to provide a curable composition; and curing the curable composition to provide an abrasive article having a void volume of at least 25 percent, a density in the range of from 0.1 g/cm³ to 1.2 g/cm³ and a Shore A durometer hardness in the range of from 10 to 50.

* * * * *

UNITED STATES PATENT AND TRADEMARK OFFICE
CERTIFICATE OF CORRECTION

PATENT NO. : 6,641,627 B2
DATED : November 4, 2003
INVENTOR(S) : Keipert, Steven J.

It is certified that error appears in the above-identified patent and that said Letters Patent is hereby corrected as shown below:

Column 6,
Line 7, insert -- copending -- preceding "applications"
Line 9, delete "U.S. Pat. No. 6,521,004" preceding "filed".

Column 12,
Line 53, "Pittsbury" should read -- Pittsburgh --.

Signed and Sealed this

Fourth Day of May, 2004

JON W. DUDAS
*Acting Director of the United States Patent and Trademark Office*